United States Patent [19]

Curtis et al.

[11] Patent Number: 5,339,305

[45] Date of Patent: Aug. 16, 1994

[54] DISK-BASED OPTICAL CORRELATOR AND METHOD

[75] Inventors: Kevin R. Curtis, Lancaster; Demetri Psaltis, Pasadena, both of Calif.

[73] Assignee: Northrop Grumman Corporation, Los Angeles, Calif.

[21] Appl. No.: 930,095

[22] Filed: Aug. 14, 1992

[51] Int. Cl.$^5$ .......................... G11B 7/00; G06K 9/76
[52] U.S. Cl. .................................. 369/112; 369/103; 359/3; 359/29; 365/125; 382/31
[58] Field of Search ................ 369/112, 94, 100, 103, 369/102; 359/29, 22, 561, 59, 26, 900, 3, 19; 382/31, 42; 365/125

[56] References Cited

U.S. PATENT DOCUMENTS

| | | |
|---|---|---|
| 4,449,785 | 5/1984 | Huignard et al. |
| 4,550,395 | 10/1985 | Carlson ............................. 369/103 |
| 4,837,843 | 6/1989 | Owechko ........................... 382/31 |
| 5,038,335 | 8/1991 | Miller ................................ 369/59 |
| 5,039,182 | 8/1991 | Dube et al. ........................ 359/3 |
| 5,111,445 | 5/1992 | Psaltis et al. ..................... 369/103 |
| 5,128,693 | 7/1992 | Tatemichi et al. ................ 359/22 |
| 5,191,574 | 3/1993 | Henshaw et al. ................. 369/103 |
| 5,212,572 | 5/1993 | Krantz et al. ..................... 369/103 |

FOREIGN PATENT DOCUMENTS 2238900 6/1991 United Kingdom .

OTHER PUBLICATIONS

Demetri Psaltis et al, "Optical Memory Disks in Optical Information Processing," Applied Optics, vol. 29, No. 14, May 10, 1990, pp. 2038–2057.

Askar Kutanow et al., "Holographic–Disk–Based Optical Neural Network," Optics Letters, vol. 17, No. 13, Jul. 1, 1992.

Demetri Psaltis, Alan Yamamura, and Hsin-Yu Li, "Mass storage for digital optical computers," Proceedings of a conference held Jan. 15–16, 1990, SPIE Critical Reviews of Optical Science and Technology, vol. CR35, pp. 155–165.

Don A. Gregory et al., "Large–memory real–time multichannel multiplexed pattern recognition," (Dec. 1984) Applied Optics, vol. 23, No. 24, p. 4560.

James R. Leger et al., "Hybrid optical processor for pattern recognition and classification using a generalized set of pattern functions," (Jan. 1982), Applied Optics, vol. 21, No. 2, p. 274.

(List continued on next page.)

*Primary Examiner*—Paul M. Dzierzynski
*Assistant Examiner*—Kim-Kwok Chu
*Attorney, Agent, or Firm*—Terry J. Anderson; Robert B. Block; Karl J. Hoch, Jr.

[57] ABSTRACT

The correlation speed and storage capacity of an optical disk-based correlator is enhanced by employing a thick (several hundred micron) photo- polymeric film (or other thick holographic media) on the disk as the recording media to permit volume holography and angular multiplexing of holograms in each spot on the disk. For example, if 100 holograms are multiplexed at one spot, 100 1-dimensional correlation functions can be read in parallel off of the disk while illuminating it with a single input image. The diffraction of the image beam by the recorded holographic patterns occurs at the holograms in the disk. The full 2-dimensional correlation function for each one of the holograms stored in a given spot on the disk is generated line-by-line a follows: By imaging in the along-track direction of the disk and Fourier transforming in the radial direction of the disk when both recording the template image hologram and presenting the input image to the recorded hologram, disk rotation generates the two-dimensional correlation functions between stored template images and the input image. All correlation functions for holograms angularly multiplexed at a given spot are generated line-by-line and detected in parallel along adjacent line detectors in the off-disk correlation plane.

34 Claims, 12 Drawing Sheets

OTHER PUBLICATIONS

William J. Miceli, "Real Time Signal Processing IX," Proceedings of SPIE, San Diego, Calif., Aug. 21, 1986.

J. T. LaMacchia and D. L. White, "Coded Multiple Exposure Holograms," (Jan. 1968), Applied Optics, vol. 7, No. 1, p. 91.

D. Gabor, "Character Recognition by Holography," (Oct. 1965), Nature, vol. 208, p. 422.

C. N. Kurtz, "Transmittance Characteristics of Surface Diffusers and the Design of Nearly Band-Limited Binary Diffusers," Journal of the Optical Society of America, vol. 62, No. 8, p. 982 (Aug. 1972).

D. L. Staebler et al., "Multiple storage and erasure of fixed holograms in Fe-doped $LiNbO_3$," Feb. 1975, Applied Physics Letters, vol. 26, No. 4, p. 182.

A. L. Mikaelyan et al., "Increase in the data capacity of holographic disks carrying one-dimensional holograms," (Sep. 1989) Sov. J. Quantum Electron. 19(9), p. 1247.

A. L. Mikaelyan et al., "Holographic disk for data storage," (May 1987) Sov. J. Quantum Electron. 17(5), p. 680.

A. A. Kutanov et al., "Holographic disk with thermoplastic recording for optical information processing," (Jul. 1991), Optical Computing and Processing, vol. 1, No. 4, p. 315.

DISK-BASED OPTICAL CORRELATOR AND METHOD

TECHNICAL FIELD

The invention is related to correlators which employ volume holograms recorded on rotatable or translatable optical media, and specifically to disk-based optical correlators having a thick photo-polymer film for recording volume holograms, in which an incoming image beam is diffracted by the hologram in the film to generate a correlation function of the hologram and the incoming "image" beam.

BACKGROUND ART

1. Optical disk-based correlators

Optical disk correlators using 2-dimensional (planar) holograms are well-known in the art. Askar Kutanov et al., "Holographic-Disk-Based Optical Neural Network," *Optics Letters*, Vol. 17, No. 13 (Jul. 1, 1992), discloses an optical disk-based correlator in which the Fourier transforms of the input image and the hologram are multiplied on disk. Demetri Psaltis et al., "Optical Memory Disks in Optical Information Processing," *Applied Optics*, Vol. 29, No. 14, 10 May 1990, pages 2038–2057 discusses the VanderLugt correlator, the photorefractive correlator and the rotating mirror correlator, which are three basic types of optical disk correlators employing two-dimensional digitally recorded images or holograms in a commercial digital reflective optical disk (such as a standard CD disk). Such devices store only one hologram in each location or recording spot on the disk.

The VanderLugt correlator is illustrated in FIG. 1a and includes an optical disk 10 on which is recorded a digital computer-generated Fourier transform hologram 12. The product of the Fourier transform of an input image 14 obtained through a spherical lens 16 and the Fourier transform hologram 12 is formed at the disk 10 and an inverse transform of this product (through the spherical lens 16) yields a 2-dimensional correlation function in an output plane 18. The VandeLugt correlator of FIG. 1a exemplifies the theorem that the correlation of two functions in the image plane is the product of their Fourier transforms in the spatial frequency domain.

In the photorefractive optical disk-based correlator of FIG. 1b, the disk 10 stores a series of digital template images 20 (not holograms) in separate recording spots rather than their Fourier transforms. Before a template image 20 is read off of the disk 10, the Fourier transform of the input image 14 (obtained through the spherical lens 16) is combined with a reference beam 22 to form a temporary hologram in an optical medium 24. Then, the image 20 is illuminated by a disk illumination beam 26 while the input beam 14 is blocked. The Fourier transform of the on-disk image 20 (obtained through the lens 16) combines with the temporary hologram in the optical medium 24. The Fourier transform of this product (obtained through a second spherical lens 28) yields the correlation image in the plane 18. If the medium 24 is a thin holographic plate, then the correlation function at the correlation plane 18 is a true 2-dimensional correlation function of the image of the input beam 14 and the template image 20. On the other hand, if the optical medium is a solid photorefractive crystal, then the image at the correlation plane is only a 1-dimensional slice of the correlation function. In order to generate the full 2-dimensional correlation function, the disk 10 is rotated to spatially shift the image so that a line detector in the correlation plane 18 detects successive 1-dimensional slices of the correlation function.

While the correlators of FIGS. 1a and 1b perform correlations in the frequency domain, the rotating mirror correlator of FIG. 1c performs correlation in the image plane. Specifically, in FIG. 1c the image (not a hologram) digitally recorded on the disk 10 is that of the template image, not its Fourier transform, and the input image 32 combines with the template image 30 in the disk 10 to form their inner product image at a single pixel detector 34. A two-dimensional array of such inner products forming the full 2-dimensional correlation function is obtained by rotating the disk 30 through the along-track width of the image 30 while the input image scans the radial height of the image 30 by means of a rotating mirror 36. Simultaneously, the output of the single pixel detector is read out in synchronism with the disk and mirror rotation. In order to increase readout speed, the rotating mirror may be replaced by a Bragg cell or acousto-optic device (not shown) which shifts the input image in synchronism with an RF chirp signal controlling the acousto-optic device.

2. Inner products from volume (3-dimensional) holograms

Solid Lithium Niobate crystals have been used to generate and store volume Fourier transform holograms of template images. By reading these holograms out with an input beam of an unknown Fourier transform image, the inner product and a one-dimensional slice of the correlation function of the input image with each template image are detected. For example, referring to FIG. 2a, a letter "A" input image 39 from an input plane 40, Fourier transformed by a spherical lens 42, and a reference beam (which has been Fourier transformed into a plane wave by a spherical lens 43) from a reference plane 44 interfere together in a solid Lithium Niobate crystal 46. The resulting interference pattern creates an electro-optical pattern 48 (shown in FIG. 3a) in the crystal 46 which remains after the interfering waves are removed.

Referring to FIG. 3a, an unknown image 50 (corresponding roughly to the letter "B") in the input plane 40 is Fourier transformed by the spherical lens 42 and diffracted by the pattern 48 in the crystal 46 to form an output beam 52. The output beam 52 is Fourier transformed by a second spherical lens 54 at an output plane 56. The output plane 56 is depicted in FIG. 3b along with the amplitude of the received light 60. The received light 60 is sensed along a column 62 in the Y direction whose X intercept is related to the X component of the location of the reference beam in the reference plane 44. The received light 60, or detected pattern, sensed along the column 62 is a sequence of inner products between the input image and shifted versions of the template image (shifted in the Y direction), which is a 1-dimensional slice of the 2-dimensional correlation function of the reference and input images. Thus, the received light 60, or detected pattern, may be referred to as a one-dimensional slice of a two-dimensional correlation function. The peak 64 of the one-dimensional correlation slice 60 is the best matched inner product.

The principal advantage of 3-dimensional holograms in the solid crystal 46 is that many images can be recorded in one spot using angular multiplexing. Referring to FIGS. 2a, 2b and 2c, three different template image holograms (corresponding to the letters "A", "B" and "C") are recorded in the solid crystal using reference beams originating at locations with three different X intercepts in the reference plane 44. These three different locations are Fourier transformed by the spherical lens 43 to three different plane wave angles, so that the three reference beams enter the crystal at three different angles. During diffraction of the input beam by the holographic pattern 48 in FIG. 3a, the diffracted beam consists of three plane waves at three different angles. The spherical lens 54 Fourier transforms these angles into three different X-axis intercepts in the output plane 56, so that three different one-dimensional correlation slices 60, 66, 68 with the three respective template images are viewed along three different columns 62, 70, 72 along the X-axis of the output plane 56, each column 62, 70, 72 corresponding to the angle of a corresponding reference beam in the reference plane 44 of FIGS. 2a, 2b, 2c. Since the input image 50 most closely resembles the template image "B", the middle correlation slice 66 has the highest peak in FIG. 3b.

While the foregoing example discusses the recording of only three template images in the same spot in the crystal 46, it is possible to separately record thousands of different images in the same spot using angular multiplexing. While this feature assures extremely high inner product computation rates, a disadvantage of the volume hologram technique of FIGS. 3a and 3b is that a correlation function is available only in one dimension (along the Y axis in the output plane 56), so that the technique is practical only for obtaining inner products and one-dimensional correlation slices between images. In addition, the individual diffraction efficiency decreases by the inverse square of the number of angularly multiplexed holograms in a single spot. Therefore, the light efficiency decreases quickly with the number of holograms.

A disadvantage of the optical disk based correlators of FIGS. 1a, 1b and 1c is that their correlation rates and storage capacities are limited, and there has seemed to be no simple way to dramatically increase the correlation rate and storage capacity of a disk-based correlator.

SUMMARY OF THE INVENTION

The correlation speed and storage capacity of an optical disk-based correlator i s enhanced by employing a thick (several hundred micron) photo-polymeric film (or other thick holographic media) on the disk as the recording media to permit volume holography and angular multiplexing of holograms on each spot on the disk. For example, if 100 holograms are multiplexed at one spot, 100 1-dimensional correlation functions can be read in parallel off of the disk while illuminating it with a single input image. The diffraction of the image beam by the recorded holographic patterns occurs at the holograms in the disk.

In the preferred embodiment of the invention, the full 2-dimensional correlation function for each one of the holograms stored in a given spot on the disk is generated line-by-line a follows: By imaging in the along-track direction of the disk and Fourier transforming in the radial direction of the disk when both recording the template image hologram and presenting the input image to the recorded hologram, disk rotation generates the two-dimensional correlation functions between stored template images and the input image. All correlation functions for holograms angularly multiplexed at a given spot are generated line-by-line and detected in parallel along adjacent line detectors in the off-disk correlation plane.

In accordance with one implementation of the invention, the optical disk is formed by spin-coating or laminating a photo-polymer material on to a standard CD size disk. The preferred photo-polymer is Dupont HRF 150 or HRF 600 photo-polymer, or, for spin-coating, Dupont HRS 150 or HRS 600 solution. The thickness of the photo-polymer film depends upon the desired number of images to be angular multiplexed in a single spot.

DETAILED DESCRIPTION OF THE INVENTION

Figure 1A:
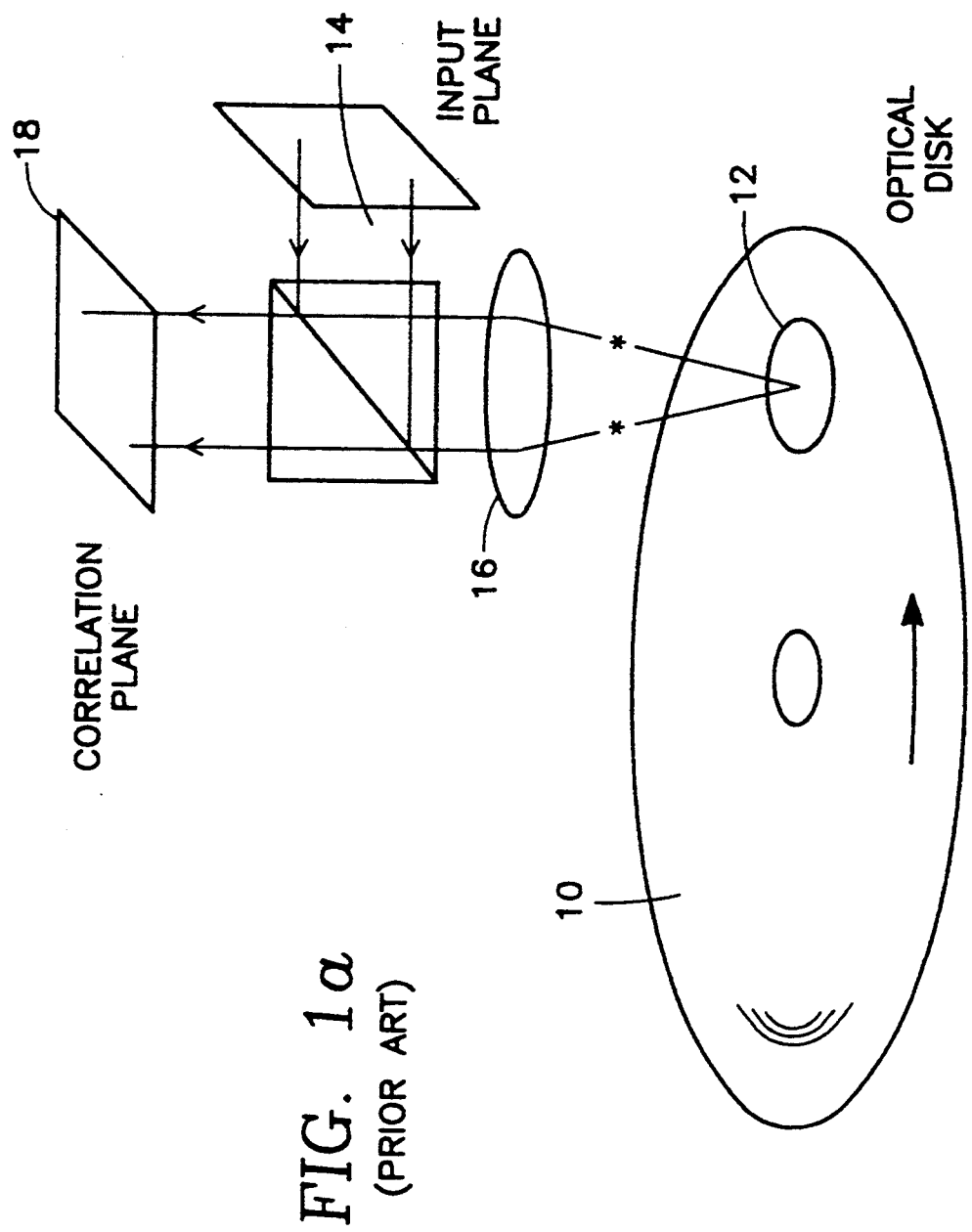
FIGS. 1a, 1b and 1c are simplified schematic diagrams of planar holographic disk-based optical correlators of the prior art.
Figure 1B:
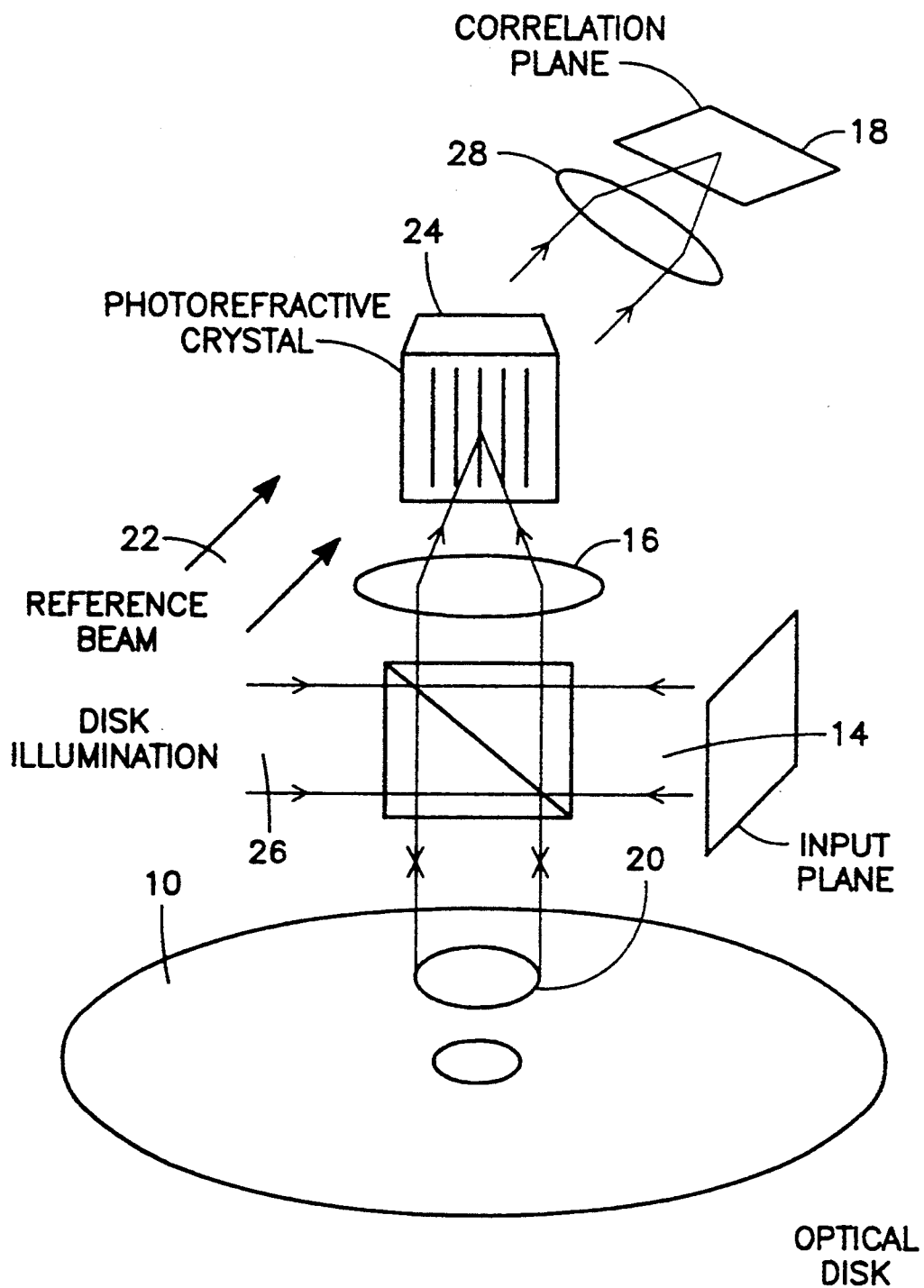
Figure 1C:
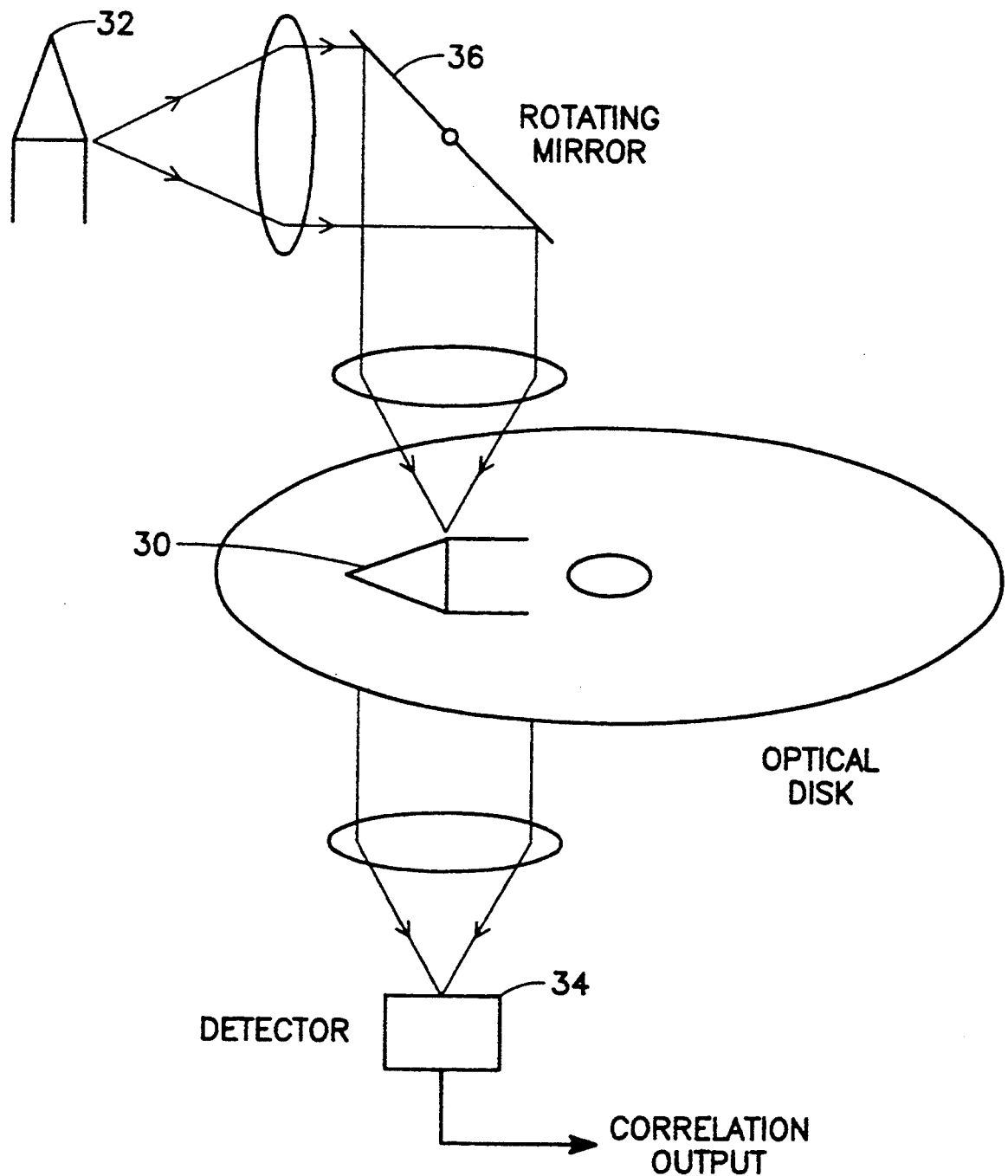
Figure 2A:
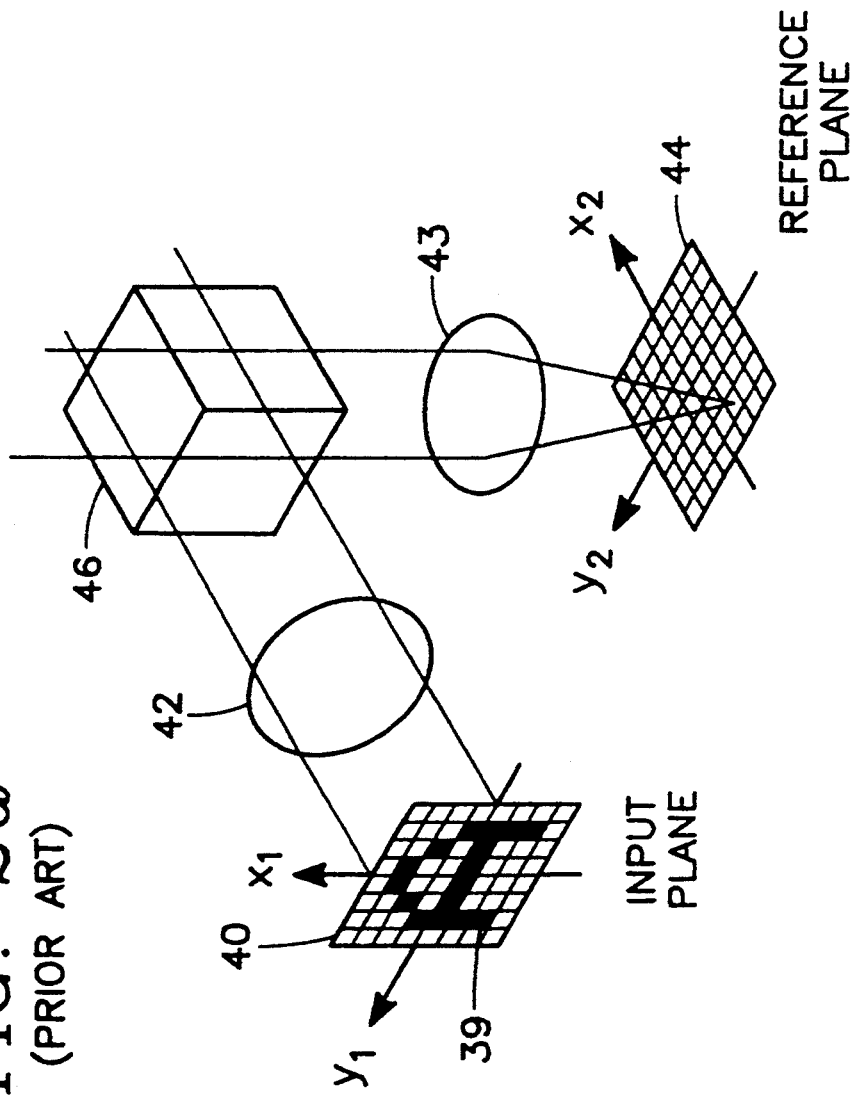
FIGS. 2a, 2b and 2c illustrate successive steps in recording angularly multiplexed solid holograms in a solid electro-optic crystal.
Figure 2B:
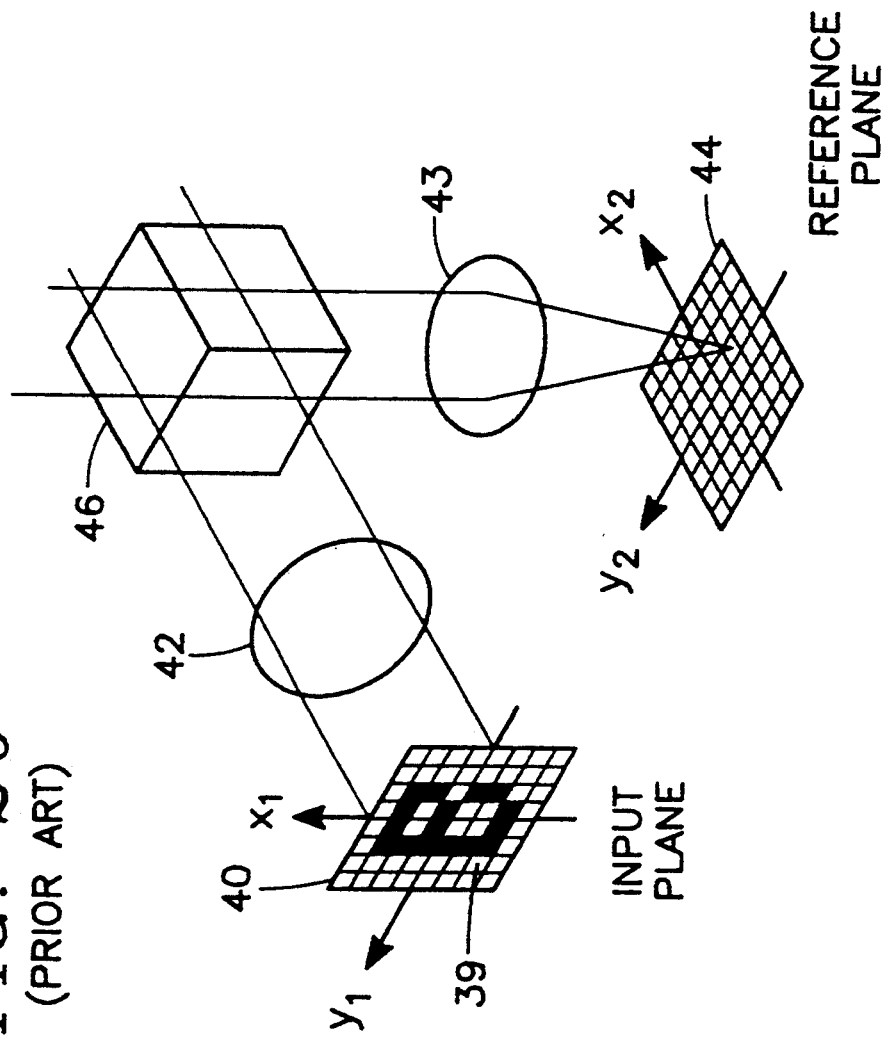
Figure 2C:
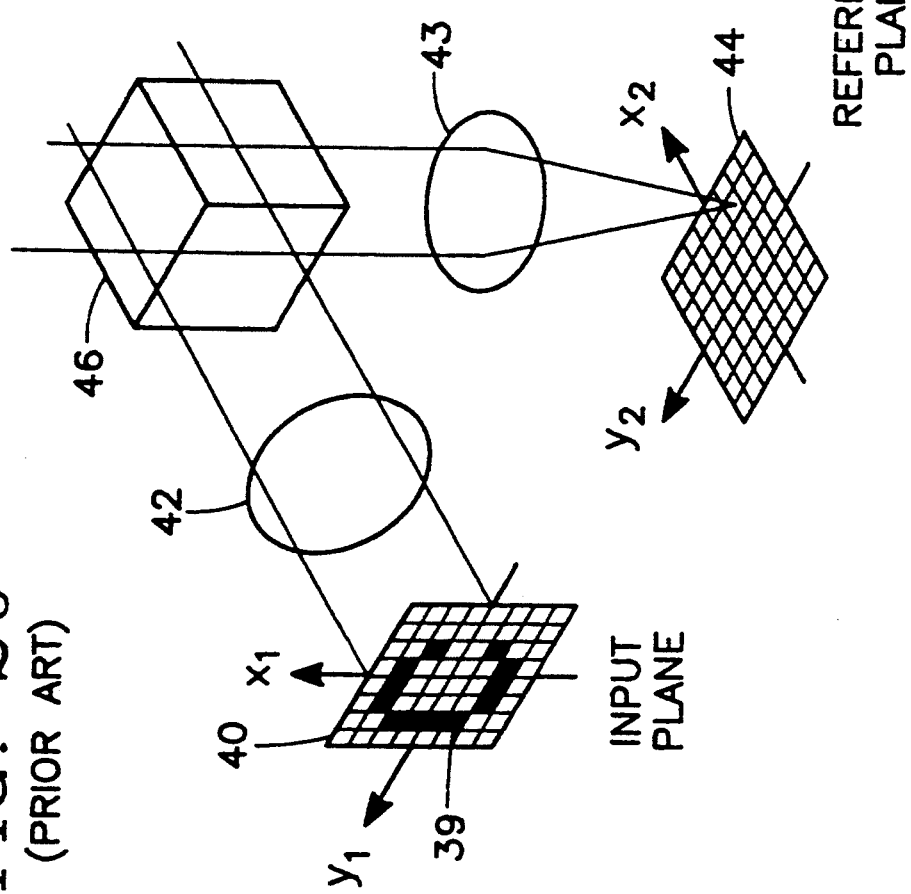
Figures 3A, 3B:
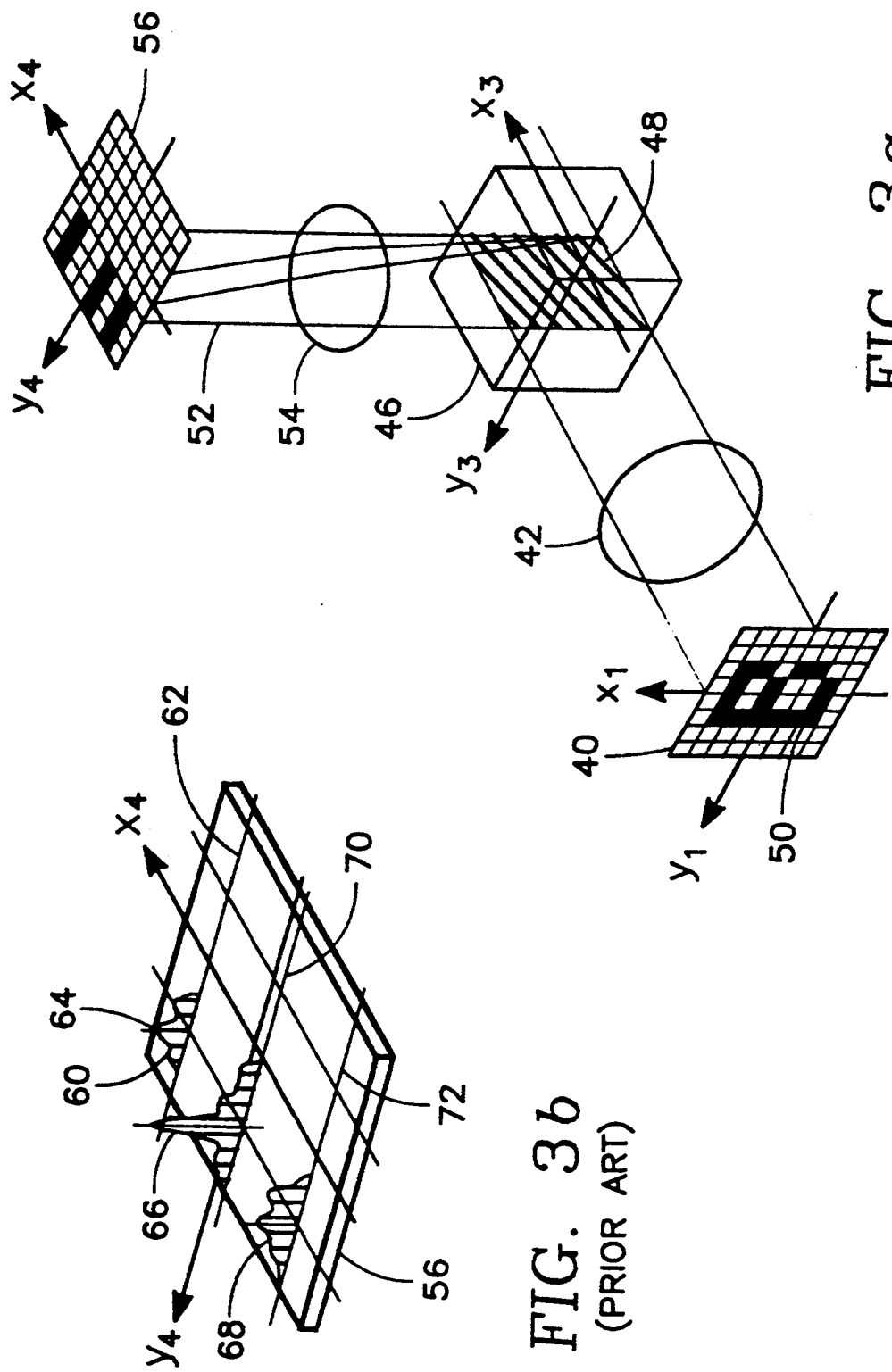
FIGS. 3a and 3b depict how inner products are generated following the steps of FIGS. 2a-2c.
Figure 4A:
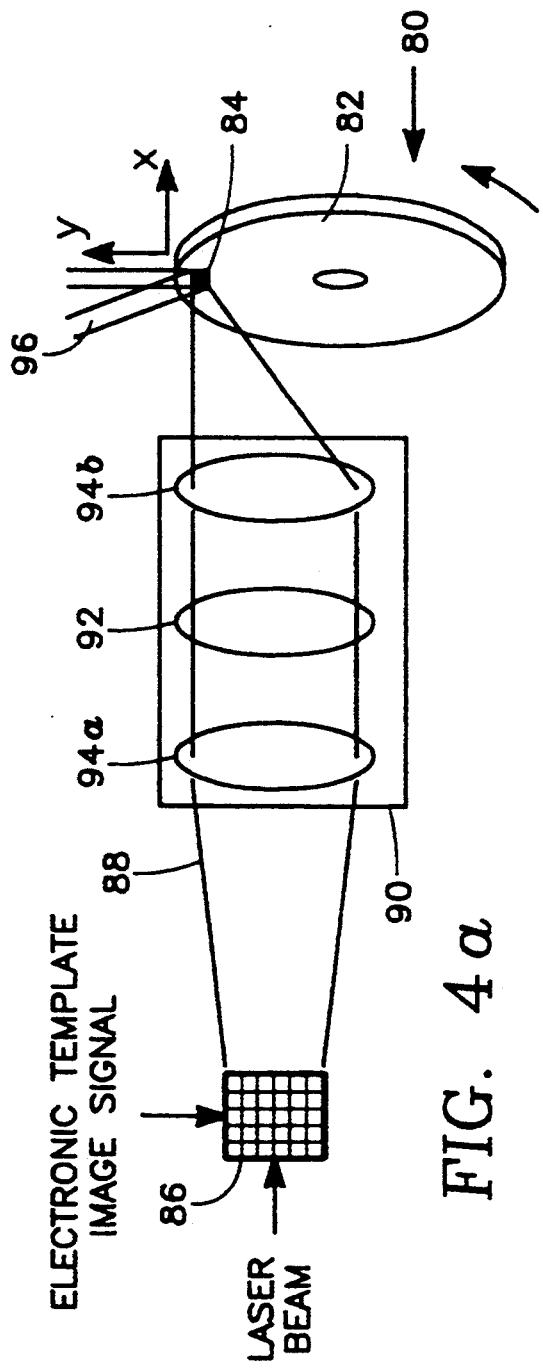
FIGS. 4a and 4b illustrate the solid hologram optical disk correlator of the present invention in a recording mode.
Figure 4B:
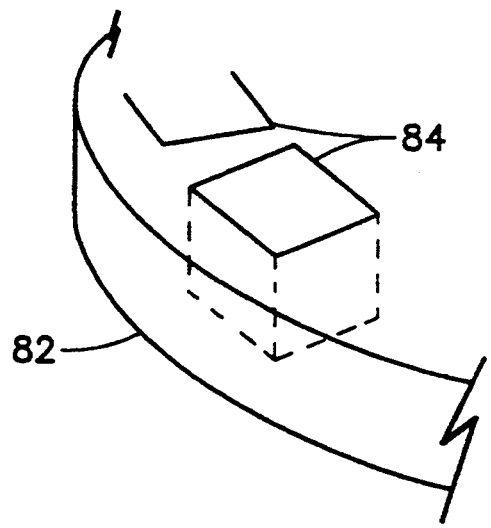

Referring to FIG. 4a, the optical disk-based correlator of the invention includes an optical disk having relatively thick photopolymer film 82 on its surface for recording volume holograms in successive cubic "spots" 84 in the film 82, as shown in FIG. 4b. In accordance with the angular multiplexing techniques described with reference to FIGS. 2 and 3, many holograms are recorded in each spot 84. In one embodiment, the disk 80 is the size of a standard CD disk, having a circumference of 36 cm. If the area of each spot 84 is 0.36 sq. cm with 0.1 cm spacing between adjacent spots, then about 2,700 spots can be recorded on the disk. If the film 82 is between 350 microns and 450 microns thick, then between 75 and 100 holograms can be angularly multiplexed in each spot 84, so that approximately 270,000 holograms can be recorded on the disk 80.

Referring again to FIG. 4a, an electronic signal representing the template image controls a spatial light modulator 86 which modulates a laser beam to produce an object beam 88 representing the template image. In this case, the object beam 88 may be referred to as a template image beam. The object beam 88 is demagnified by optics 90 onto a small spot 84 in the photopolymer film 82 while the disk 80 is not rotating. Simultaneously, a reference beam 96 derived from the same laser beam used to produce the object beam 88 is demagnified onto the spot 84 at a predetermined angle to interfere with the object beam 88 and generate and record a hologram of the template image in the spot 84. While the disk 80 continues to be constrained from rotating, the angle of the reference beam 96 is changed by an incremental amount and the next template image is presented to the spatial light modulator 86. This causes a hologram of the next template image to be recorded in the same spot 84 at a slightly different angular orientation. The process is repeated until a number of holograms have been recorded at successive angular orientations in the same spot 84. Then, while the object beam 88 and reference beam 96 are blocked, the disk 80 is rotated until the object beam 88 can be focused on the next spot 84, and the foregoing process is repeated.

For reasons that will be described below in greater detail, in the preferred embodiment of the invention the optics 90 images the object beam 88 onto the disk 80 in the disk's along-track direction and Fourier transforms the object beam 88 in the disk's radial direction.

Figure 5:
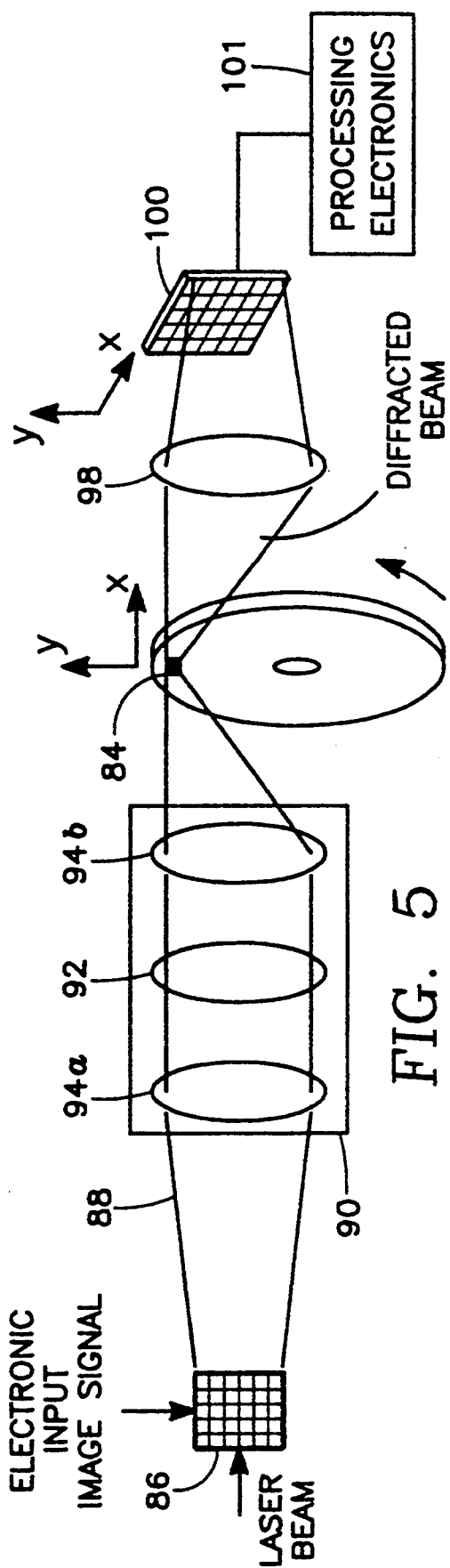
FIG. 5 illustrates the solid hologram disk correlator of FIG. 4a in the readout or correlation mode.

Referring to FIGS. 4 and 5, correlation of each of the template images at a given spot 84 with an unknown or input image is performed by blocking the reference beam 96 and presenting the input image signal to the spatial light modulator 86. Now, the object beam 88 represents the input image rather than a template image, and may be referred to as an input image beam. As before, the object beam 88 is imaged onto the spot 84 in the along-track direction and Fourier transformed in the radial direction by the optics 90. Now, however, the object beam 88 is diffracted by the holograms previously recorded in the spot 84. The diffracted beam passes through the plane of the disk 80 and through a spherical lens 98 onto a detector plane 100. The diffracted beam consists of different correlations mixed onto different carder plane waves with different angular frequencies corresponding to the different angles of the reference beam 96 used in generating the various holograms recorded in the spot 84. The spherical lens 98 Fourier transforms the diffracted beam so that each of the angular frequencies is mapped to a different location along the X-axis of the detector plane. Thus, each column of detectors (lying along the Y direction corresponding to the disk radial direction) on the detector plane 100 detects a 1-dimensional slice of the correlation between the input image and a corresponding one of the template images. For example, if 100 holograms are angularly multiplexed at a given spot, then 100 line detectors are needed to detect the correlations.

As noted previously, the diffraction of the input image beam 88 by a volume hologram of a template image of the type recorded in the relatively thick photopolymer film 82 produces only a 1-dimensional slice of the correlation function (along the Y axis or radial direction of the disk in FIG. 5), rather than the full correlation function. However, a full 2-dimensional correlation function is read off of the disk 80 as follows: Rather than Fourier transforming the object beam 88 in both dimensions (X and Y) of the input plane (as in FIGS. 2a–2c) by a spherical lens, the optics 90 Fourier transforms the object beam 88 in both FIGS 4a and 5 along only the Y-axis (radial direction) of the disk 84 (as briefly mentioned previously herein) by a cylindrical lens 92 whose cylindrical axis of curvature is parallel to the X-axis (along-track direction) of the disk 80. The outer two lenses 94a, 94b of the optics 90 are cylindrical lenses whose cylindrical axes of curvature are perpendicular to the axis of curvature of the middle lens 92, so that the outer two lenses 94a, 94b image the object beam 88 onto the disk along the disk X-axis (along-track direction). Therefore, what is recorded in the operation of FIG. 4a is a hologram of the reference image Fourier transformed in the Y direction and imaged in the X direction. Following the recording operation of FIG. 4a, in FIG. 5 the object beam 88 (which is now the input image beam) passes through the optics 90 (comprising the same three lenses 92, 94a, 94b) so that it too is Fourier transformed in the Y (radial) direction and imaged in the X (along-track) direction onto the spot 84. The disk 80 is rotated along an arc length corresponding to the along-track length of the spot 84 (about 0.1 degree) to produce a nearly linear shift that generates a succession of 1-dimensional correlation slices (each one corresponding to a successive shift of the correlation slice 60 of FIG. 3b) along the X axis (along-track direction) of the disk in FIG. 5. The angle of disk rotation (0.1 degree) between successive correlation slices is so small that it may be considered a linear shift. The successive correlation slices are between the input image and successively linearly shifted versions of the template image, and therefore provides the 2-dimensional correlation function in a particular column of detectors lying along the Y direction of the detector plane 100. Processing electronics 101 processes the output of the detectors of the detector plane 100 in accordance with output system requirements.

The rate at which correlation or inner product information can be obtained is limited by the rate of the line detectors comprising the detector array 100, typically about 30 MHz. Specifically, given the size and spacing of the spots 84 described above with reference to FIGS. 4a and 4b, the 30 MHz rate of the detector array limits the disk rotation rate to not more than about 2.44 revolutions per second. If one hundred spots 84 are recorded in each track on the disk 80, and each spot stores one hundred angularly multiplexed holograms, then the 2.44 disk rotation rate permits 24,000 correlations per second to be performed. If the spatial light modulator is a 240-by-370 pixel array, then the 24,000 correlations performed digitally would have required about $10^{14}$ integer operations per second.

Figure 6:
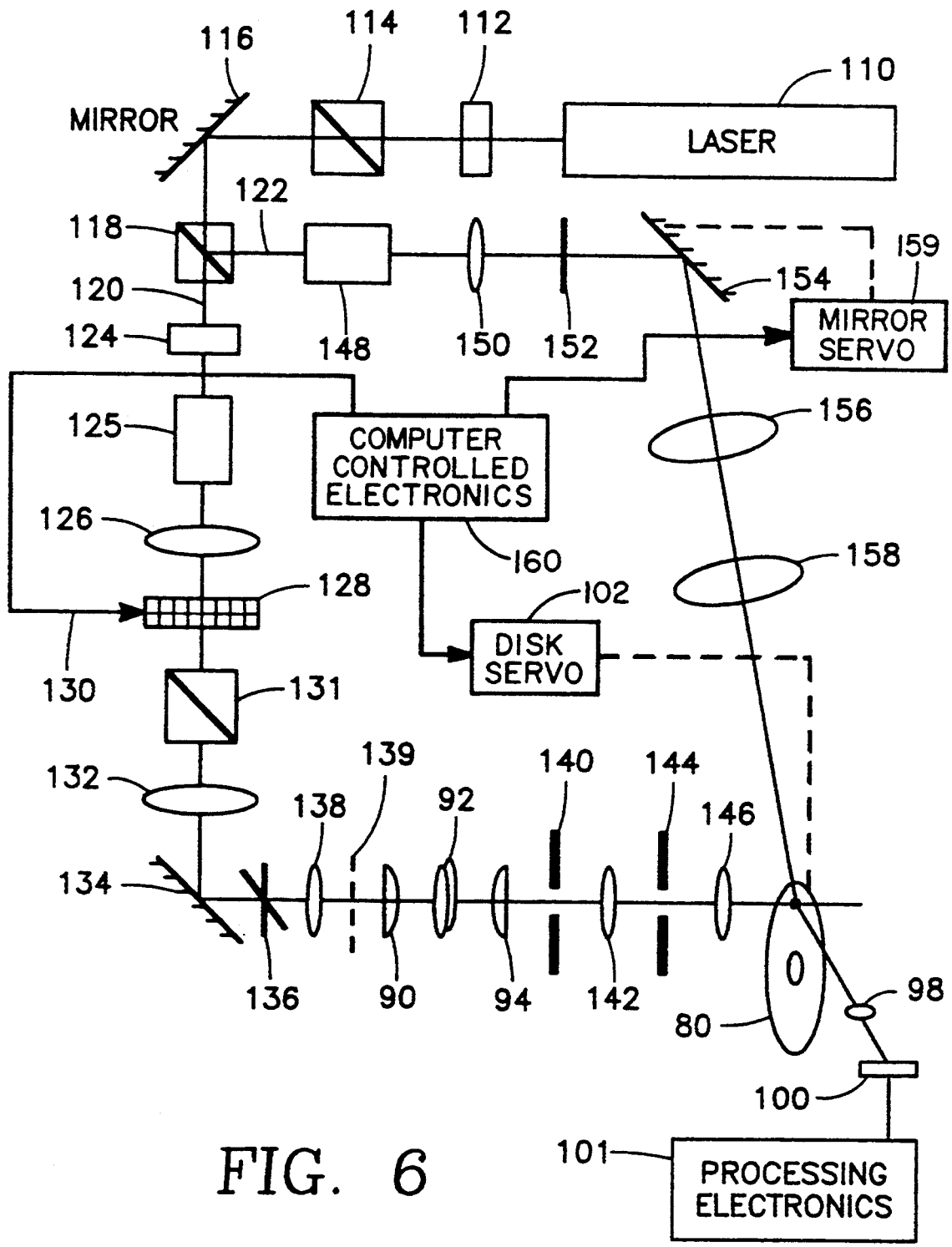
FIG. 6 is a schematic diagram of a system embodying the invention.

A tested implementation of the invention is illustrated in FIG. 6. An argon laser 110 produces a 488 nanometer laser beam which is attenuated by the combination of a half-wave plate 112 and a polarizing beam splitter 114. A mirror 116 turns the light path. A non-polarizing beam splitter 118 splits the beam into object and reference beams 120, 122 of equal intensity. A second half-wave plate 124 attenuates the object beam before it passes through a beam expander 125 and a collimating lens 126. A spatial light modulator 128 consisting of an array of 320 by 240 pixels modulates the intensity of the object beam by changing the polarization orientation at each pixel in accordance with an electronic input signal 130 representing either a template image (during the recording operation of FIG. 4a) or an input image (during correlation operation of FIG. 5). A polarizing beam splitter 131 converts the polarization modulation of the object beam introduced by the spatial light modulator 128 to intensity modulation. A spherical demagnifying lens 132 Fourier transforms the object beam, a second mirror 134 turns the light path and a DC block 136 blocks out low frequency Fourier components of the Fourier transformed object beam near the center of the beam. The DC blocking could also be done digitally before presenting the image to the system. Preferably, during recording a phase diffuser is included at the Fourier plane of the image on the spatial light modulator. The phase diffuser introduces a random phase across the Fourier plane, which advantageously increases the uniformity of distribution of the recorded energy of the image beam across the spot 84. A second demagnifying lens 138 Fourier transforms the Fourier-transformed object beam back to the image plane. Then, the three lenses 92, 94a, 94b described above with reference to FIGS. 4a and 5 Fourier transform the object beam along one radial direction (Y-axis) of the disk 80 while imaging the object beam in the along-track (X-axis) of the disk 80.

In one preferred implementation of the invention, the second demagnifying lens 138 is followed by an image plane 139 while the outer lens 94b is followed by an output plane 140 spaced apart from the image plane 139 by a length L. The middle lens 92 is equidistant from the image plane 139 and the output plane 140, the outer lens 94a is equidistant from the image plane 139 and the middle lens 92, and the outer lens 94b is equidistant from the output plane 140 and the middle lens 92. The middle lens 92 has a focal length of L/2 while the outer lenses 94a and 94b each have a focal length of L/4. A filter at the output plane 140 blocks higher diffraction orders of the spatial light modulator 128 along the Y-axis (radial direction), a demagnifying lens 142 Fourier transforms the beam, a second filter 144 blocks higher diffraction orders of the spatial light modulator 128 along the X-axis (along-track direction) and a second demagnifying lens 146 Fourier transforms the beam again.

The reference beam 122 travels a light path including a beam expander 148, a collimating lens 150, an aperture 152 and a rotating mirror 154. The angle of the reference beam is changed when performing angular multiplexing by rotating the mirror 154. If the photo-polymer layer 82 is about 450 microns thick so that each spot 84 can store 100 angularly multiplexed holograms, the mirror 154 changes the beam angle from −5 degrees to +5 degrees in 100 increments during recording of the 100 holograms in an individual spot 84. In order to keep the reference beam on the same spot 84 on the disk 80 without moving while allowing the mirror 154 to rotate, a pair of spherical lenses 156,158 having the same focal length F are placed in the beam path as shown in FIG. 6 in a 4-F configuration. If the mirror 154 is in an image plane of the reference beam 122, then the first lens 156 is located a distance of 1F away from the rotating mirror 154, the two lenses 156, 158 being displaced from each other by a distance of 2F and the second lens being displaced from the surface of the disk 80 by a distance of 1F. During readout, the reference beam is blocked, and an unknown input image signal is applied to the spatial light modulator 128. The detector plane 100 has an array of line detectors aligned in the radial direction of the disk 80, each line detector viewing a 1-dimensional correlation slice of a different one of the holograms recorded in the same spot 84 as illustrated in FIG. 3b. By rotating the disk 80 through the arc length of one "spot" 84, each line detector in the detector plane 100 views a succession of 1-dimensional correlation slices which together comprise a 2-dimensional correlation function of the input image with the corresponding hologram.

Synchronization between the succession of template images transmitted as electronic signals to the spatial light modulator 128 and the succession of angular positions to which the rotatable mirror must be oriented is controlled by a mirror servo 159 and computer controlled electronics 160.

Suitable media for use in the invention include photopolymers, photorefractives, and photographic film emulsions. An example of suitable photorefractive photopolymer is IBM Photorefractive Photopolymer. Examples of suitable photochemical photopolymers include DuPont HRF 150 and HRF 600, and Polaroid DMP-128. Examples of suitable photorefractives include for example, iron-doped lithium niobate ($LiNbO_3$ : Fe) and Strontium Barium Niobate ($SrBaNbO_3$). Suitable photographic emulsions include Kodak 649F and Kodak 131/SO-253.

Examples of thicknesses that are useable in the invention in providing sufficient depth to acheive volume holography are as follows:

The thickness of the films is definable in terms of the wavelength of the light emplyed. A thickness of greater than about 10 wavelengths is suitable for applications of about 2 angularly multiplexed images while thicknesses of 800 wavelengths gives the results described herein. Thicker films, even up to millimeters or centimenters thick, will allow even greater storage.

Test Results

Using the system of FIG. 6, 300 transmission holograms were stored on one ring of a holographic (6 cm radius) disk. Using DuPont's HRF-150 photo-polymeric film and exposing with 488 nm light, three holograms (image plane along-track and Fourier transformed radially) were stored at 100 spots on the disk using the methods described above. The object size was approximately 0.9-by-0.6 mm with 9.2 micro-Watts intensity recorded with a 1 cm-by-1.5 mm plane wave reference beam with 114 micro-Watts intensity. Each hologram was exposed for 5 seconds. Disk rotation between spots was 1.5 degrees. Each of the holograms was an image of four boxes illustrated in FIG. 7.

Figure 7:
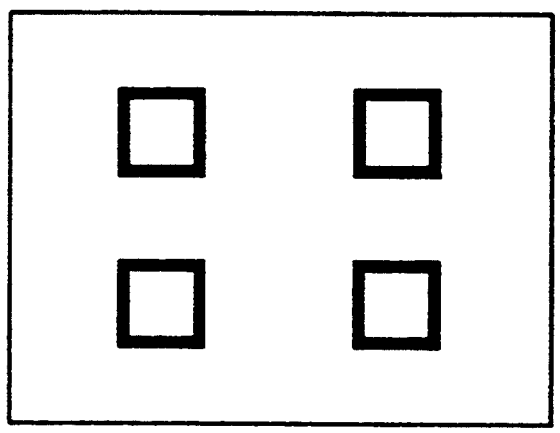
FIG. 7 is an image employed in testing the invention.
Figure 9:
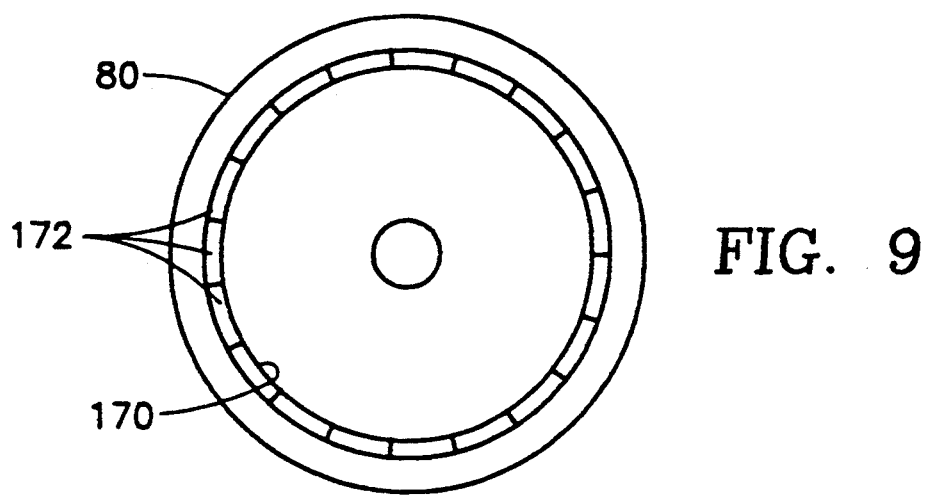
FIG. 9 is a diagram of an optical disk for use in pattern identification systems.
Figure 8:
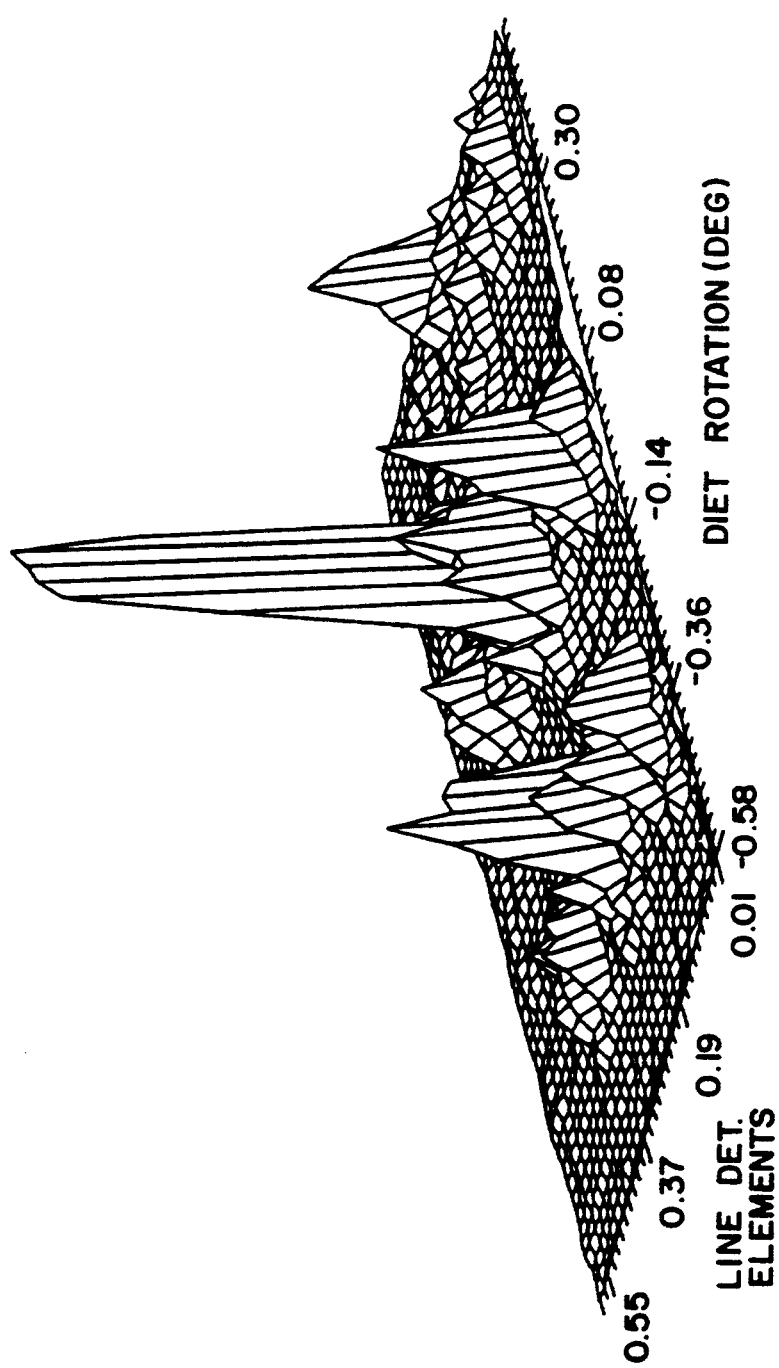
FIG. 8 is an autocorrelation function of the image of FIG. 7 obtained in a test of the embodiment of FIG. 6.

To test the correlator an experimental autocorrelation squared of the image of FIG. 7 was measured using the correlator mode of the system of FIG. 6. FIG. 8 is the experimental plot of the autocorrelation squared of the image of FIG. 7 thus obtained. The autocorrelation function of FIG. 8 was generated by storing the image of FIG. 7 on the disk in accordance with the method described above, and then presenting the same image to the disk. The detector plane 100 comprised a line detector in this experiment. The line detector was read out while the image of FIG. 7 was presented to one spot, the disk was rotated to the next spot, and the line detector was read out again. This procedure was repeated until the entire 2-dimensional autocorrelation function squared of FIG. 8 was generated. Since the four boxes in the image of FIG. 7 occupy a large portion of the input plane of the spatial light modulator 128, FIG. 8 demonstrates that the correlation ability exists across most of the input plane.

Theory of Operation of the Invention

The following mathematical analysis has been developed and is given here in aid of understanding the invention, however, we do not wish to be bound thereby.

Before Disk

The light intensity at an image plane of the object beam 88 in FIG. 6 near the lens 138 is a real function f(x,y) where f(x,y) is real function. In the x direction, f(x) goes through two lenses 94a, 94b arranged in a four focal length system. Equations 1 and 2 immediately below define the changes in f(x) by each of the lenses 94a, 94b, respectively:

1. $f(x'') = \int_{-\infty}^{\infty} f(x'')e^{-j\frac{2\pi xx''}{\lambda F_1}} dx'' = F\left(\frac{x''}{\lambda F_1}\right)$ 2. $f(x') = \int_{-\infty}^{\infty} f(x'')e^{j\frac{2\pi x''x'}{\lambda F_2}}$ $= \int_{-\infty}^{\infty} F\left(\frac{x''}{\lambda F_1}\right)e^{-j\frac{2\pi}{\lambda F_2}x''x'}$ Now we change variables:

$$w = \frac{x''}{\lambda F_1} \quad x'' = \lambda F_1 w$$

$$dw = \frac{1}{\lambda F_1} dx'' \rightarrow dx'' = \lambda F_1 dw$$

Then, Equation 2 becomes:

$$f(x') = \lambda F_1 \int_{-\infty}^{\infty} F(w)e^{-j\frac{2\pi}{\lambda F_2}\lambda F_1 w x'} dw$$

Now, using the duality of the Fourier transform:

$$f(x') = \lambda F_1 f\left(\frac{F_1}{F_2}x'\right)$$

This images f(x) to f(Mx), where M is inversely proportional to the magnification. Therefore, the optics before the disk is an imaging system in the X-direction, so that $f(x) \rightarrow f(M_1 x^1)$.

Now in the Y-direction, the image is Fourier transformed by the middle cylindrical lens 92, so that $$f(y') = \int_{-\infty}^{\infty} f(y)e^{-j\frac{\pi yy'}{\lambda F}} dy = F(\nu) = F\left(\frac{y'}{\lambda F}\right)$$

Here $\nu$ is a spatial frequency. Thus, the cylindrical optics before the disk images in x direction and takes the Fourier Transform in y direction, so that:

$f_x(X)f_y(y) \rightarrow f_x(Mx')F_y(My')$ All the other optics simply demagnify the information. During recording of the holographic image, we may represent the holographic disk as a transparency T, the transparency (hologram) is governed by the light intensity I, so that: $T(x',y') \approx I(x',y')$ (within angular selectivity limits).

To create the hologram, the signal A (image in x and Fourier Transform in y) is mixed with with a reference plane wave R with spatial frequency $\mu$, as follows:

$$I = |Re^{j2\pi\mu x'} + \underbrace{f(Mx',\nu)}_{A}|^2 = R^2 + A^2 + ARe^{-j2\pi\mu y'} + A^*Re^{j2\pi\mu x'}$$

This leads to:

$$T(x',y') \approx f^*(Mx',\nu)e^{j2\pi\mu x'}$$

To perform a correlation, we input another function g(x,y) at input plane representing the "unknown" input signal. After the cylindrical optics before disk (i.e., the lenses 92, 94a and 94b) g(x,y) is mapped into g(Mx,v). After disk Assuming g and f are separable (for clarity), the signal transmitted through the disk and received at the detector plane is $$S(x',y') = g_x(M_1 x',)f_x(M_1 x')G_y(M_2 y')F_y^*(M_2 y')e^{j2\pi\mu x'}$$

This signal is then Fourier transformed by a spherical lens, with focal length F, and then detected a distance 2F away from the disk. Ignoring the reconstructed plane wave that uniquely shifts (for each angularly multiplexed hologram) the result on the detector plane, the signal is given by:

$$S(x_d,y_d) = e^{j2\pi\mu x_d}\int_{-\infty}^{\infty}\int_{-\infty}^{\infty} g_x(M(x')f_x(M_1 x')G_y(M_2 y')F_y^*(M_2 y')e^{-j\frac{2\pi}{\lambda F}(x'x_d + y'y_d)} dx'dy'$$

where the subscript d denotes the detector plane.

Detecting only at $X_d = 0$.
Then, the signal is:

$$S(0,y_d) = \int_{-\infty}^{\infty} \underbrace{g_x(Mx')f_x(Mx')dx'}_{\text{Inner Product}} \int_{-\infty}^{\infty} \underbrace{G_y(M_2 y')F_y^*(M_2 y')e^{-j\frac{2\pi}{\lambda F}y'y_d}}_{\text{Correlation of } f^*g} dy$$

or equivalently if f and g are real functions, $$S(0,y_d) \approx \int_{-\infty}^{\infty} g_x(Mx)f_x(Mx')dx' \int_{-\infty}^{\infty} g_y\left(\frac{M_2 y_d}{\lambda F}\right)f_y\left(\frac{M_2}{\lambda F}(y_d + y')\right)dy'$$

The intensity at the detector plane is $I(X_d,Y_d) = SS^*$ or $I(0,y_d) = $ (Inner Product of $g(x)f(x))^2$ (Correlation of $g(y)f(y))^2$ Disk rotation in a small angle approximation is a linear shift in the x direction. It is this shift which generates the 2D correlation function with time. Thus, the signal is:

$$S(0,y_d) = \int_{-\infty}^{\infty} \int_{-\infty}^{\infty} \underbrace{g_x(Mx')f_x(Mx' + \theta)dx'd\theta}_{\text{Shifted Inner Products}} \int_{-\infty}^{\infty} \underbrace{G_y(M_2y')F_y^*(M_2y')e^{-j\frac{2\pi}{\lambda F}y'y_d}dy}_{\text{Correlation of } f*g}$$

If f and g are not separable, the analysis works out exactly the same except that the integrals can not be separated.

Signal Shift Effects of Disk Rotation (Media Movement)

The effects of disk rotation on the detected correlation function, while negligible for many applications, has been calculated for the convenience of the system designer, and the results are given here. We determine the effect of disk rotation on the correlation plane for volume holograms within the angular selectivity limits of a single angularly multiplexed hologram.

Case I
2 Plane Waves

In this case, the image and the reference beam with which the image interferes to create a hologram are treated as plane waves and the same image treated again as a plane wave is presented to the hologram to produce a correlation. In the following results, $\alpha$ is the angular frequency along x of the reference beam, $\beta$ is the angular frequency of the image beam along x and $\delta$ is the angular frequency of the image beam along z (the direction of propagation). All coordinates (x, y and z) are in the image plane. $d\theta$ is the increment of disk rotation angle. $\lambda$ is the wavelength. R is the reference beam. S is the image beam. The signal detected at the correlation plane (the detector plane 100) is:

$$SRS^* = e^{-j2\pi\alpha x} e^{j2\pi(\alpha-\beta)yd\theta} e^{j2\pi\delta x d\theta}$$

in which:

$e^{-j2\pi\alpha x}$ is the correct reconstruction without disk rotation, $e^{j2\pi(\alpha-\beta)yd\theta}$ is the shift in y-direction at the correlation plane, and $e^{j2\pi\delta x d\theta}$ is the shift in x-direction at the correlation plane.

Case II
Spherical and Plane Wave - Image Plane Hologram

In this case, the same procedure is followed except that the image beam S is treated as a spherical wave while the reference beam R is a plane wave. The coordinates of the image plane (as distinguished from the detector plane) are denoted by a subscript 0.

The signal detected at the correlation plane is:

$$SRS^* = e^{-j2\pi\alpha x} e^{-j2\pi(\frac{x_0}{\lambda z_0} - \alpha)yd\theta} e^{j\frac{2\pi}{\lambda z_0}y_0 x d\theta}$$

in which:

$e^{-j2\pi\alpha x}$ is the reconstruction without rotation, $$e^{-j2\pi(\frac{x_0}{\lambda z_0} - \alpha)yd\theta}$$

is the shift in y-direction at the correlation plane, and $$e^{j\frac{2\pi}{\lambda z_0}y_0 x d\theta}$$

is the shift in x- direction at the correlation plane.

Case III
Cylindrical Wave and Plane Wave Reconstruction - Image Plane in x and Fourier Plane in y.

In this case, the image is treated as a cylindrical wave, and the notation is as defined in the previous cases. The terms are as defined above, and, in addition, $$\text{we define } \nu = \left(\alpha - \frac{x_0}{\lambda z_0}\right)d\theta,$$

$$\beta' = \beta d\theta, \text{ and}$$

$$\gamma = \frac{d\theta}{xz_0}.$$

The signal detected at the correlation plane is:

$$SRS^* = e^{-j2\pi\alpha x} e^{j2\pi(\nu y + \beta' x + \gamma xy)}$$

in which:

$e^{-j2\pi\alpha x}$ is the reconstructed wave without rotation, $e^{j2\pi\nu y}$ is the shift in the y direction at the correlation plane, $e^{j2\pi\beta' x}$ is the shift in the x direction at the correlation plane, and $e^{j2\pi\gamma xy}$ is the shift on a hyperbola in the correlation plane.

Effect of Linear Translation of the hologram on the Correlation Plane

The invention is not confined to disks as a moving volume holographic media, and indeed linearly transportable volume holographic media may be employed in carrying out the invention. Accordingly, the following analysis concerns the effects of linear motion on the correlation. In the following analysis, the motion is assumed to be in the x direction only with a constant velocity v, so that x is transformed by x+vdt during an incremental time shift dt.

Case I 2 plane waves in general This case corresponds to the case of two plane waves discussed above with regard to disk rotation. The definitions of terms are as before. The signal detected at the correlation plane is:

$$SRS^* = e^{j2\pi\beta x} e^{j2\pi\delta y} e^{j2\pi\alpha(x+vdt)} e^{-j2\pi\beta(x+vdt)} e^{-j2\pi\delta y}$$

in which:

$e^{j2\pi\alpha x}$ is the correct reconstruction without shift, and $e^{j2\pi(\alpha-\beta)vdt}$ is a phase term that is not detected.

Case II Spherical & Plane Wave

This case corresponds to the spherical and plane wave case discussed previously with reference to disk rotation. The signal detected at the correlation plane is:

$$SRS^* = e^{j2\pi\alpha x} e^{j2\pi vdt(\alpha+\frac{x_0}{\lambda z_0})} e^{-j2\pi(\frac{vdt}{\lambda z_0})x}$$

in which:

$e^{j2\pi\alpha x}$ is the correct reconstruction without shift, $$e^{j2\pi vdt(\alpha + \frac{x0}{\lambda z0})}$$

is a phase term that is not detected, and $$e^{-j2\pi(\frac{vdt}{\lambda z0})x}$$

is the shift in the x direction at the correlation plane.

Case III—Cylindrical and Plane Wave

This case corresponds to the cylindrical and plane wave case discussed above with reference to disk rotation. The signal detected at the correlation plane is:

$$SRS^* = e^{j2\pi\alpha x} e^{j2\pi(\alpha + \frac{x0}{\lambda z0})vdt} e^{-j\frac{2\pi}{\lambda z0} vdtx}$$

in which:

$e^{j2\pi\alpha x}$ is the correct reconstruction without shift, $$e^{j2\pi(\alpha + \frac{x0}{\lambda z0})vdt}$$

is a phase term that is not detected, and $$e^{-j\frac{2\pi}{\lambda z0} vdtx}$$

is the shift in x direction in the correlation plane.

Industrial Uses of the Invention

The commercial uses of the disk-based optical correlator include model-based vision, fingerprint identification, parts identification and quality assurance, voice print matching, access-control through facial identification, massive data storage, neural network implementations, robotics position and orientation identification, postal ZIP code reader and signature identification. The military uses of the disk-based optical correlator include Automatic Target Recognition (ATR) model-based vision, map correlators, symbol correlation decoders, preamble detection, doppler correction, error detection and correction decoders, beam forming, signal detectors and transversal adaptive filters.

As an example of applying the present invention to a facial identification system, the optical disk-based correlator solves the problem of finding the rotational orientation and displacement in along one dimension of the unknown facial image with respect to the library of stored template images. For this purpose, a single track 170 of the disk 80 of FIG. 7 is divided into twenty segments 172, alternate segments 172 consisting of 10 holograms stored in successive along-track locations and the remaining segments 172 being empty. The holograms in each segment 172 are of 10 different types of human eyes typifying the entire population, the ten images of each segment being in a particular rotational orientation, so that ten different rotational orientations are represented. Ten human eye images are required because the differences between various types of eyes are so great that insufficient correlation may exist for a particular unknown eye image unless all types are present in the data base. The unknown image is the input image. The disk is rotated through the ten images in the first segment 172 so that one column or line detector in the detector plane 100 views ten 1-dimensional correlation slices in succession. In order to form a cumulative average, the line detector is "on" as the disk rotates so that it accumulates a sum often 1- dimensional correlation slices. Then, the disk is rotated through the second (empty) segment 172 while the sum of the ten 1-dimensional correlation slices are read out by the line detector in the detector plane 100. This process is repeated for each pair of adjacent segments 172 until an "average" 1-dimensional correlation function has been obtained for each segment storing 10 holograms. The rotational orientation of the unknown image is obtained by determining which one of the segments has the greatest average correlation function. The displacement of the unknown image in the direction of the 1- dimensional correlation function (along the Y-axis in FIG. 3b) is given by the location within any one of the average correlation functions of the peak.

Once the displacement and orientation of the unknown image is determined in accordance with the foregoing, the input image orientation and displacement is corrected. Then its correlations with a large library of templates stored as angularly multiplexed volume holograms on an optical disk are determined in accordance with the description of FIG. 5.

Figure 10:
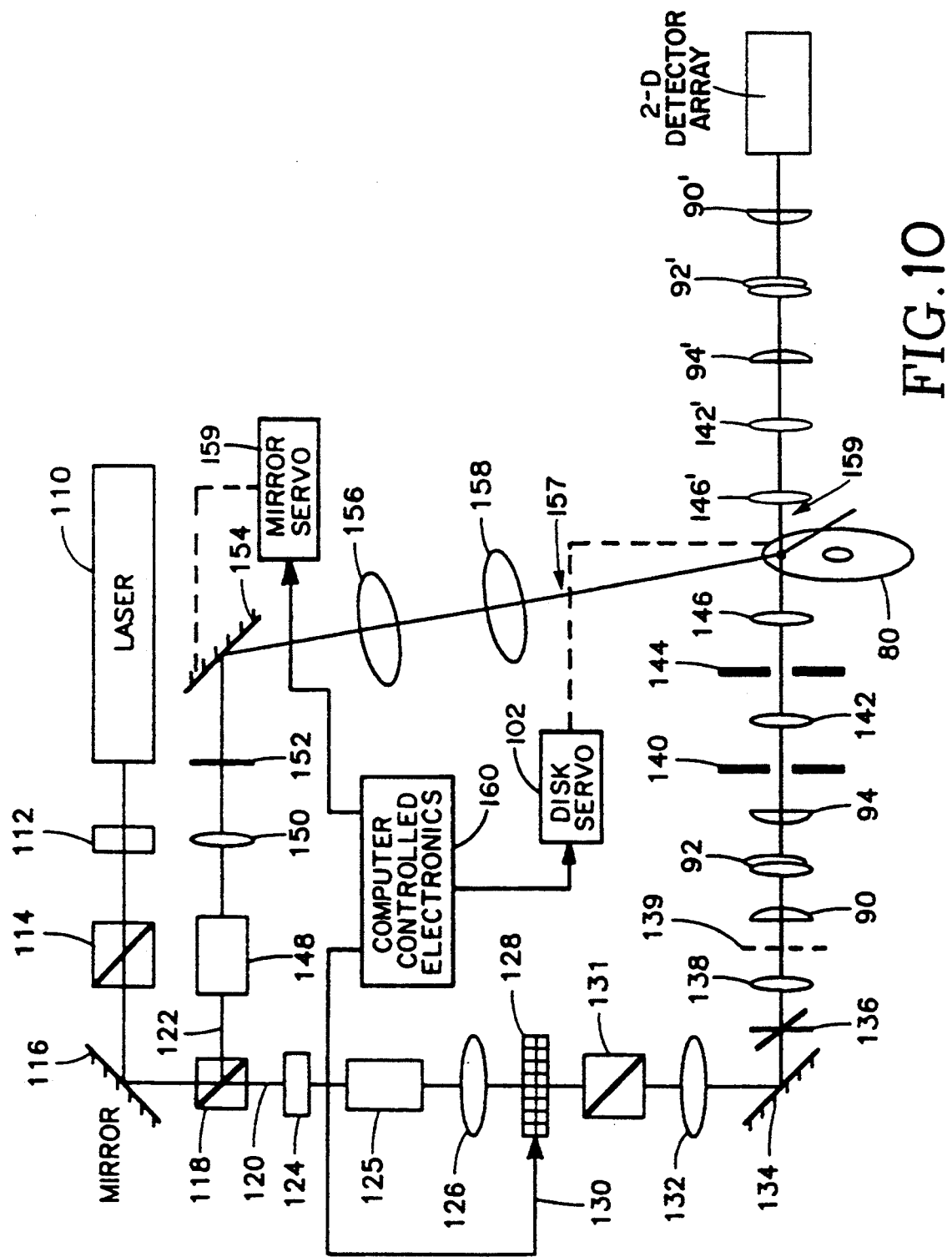
FIG. 10 is a schematic diagram of another embodiment of a system constructed according to the invention illustrating its use in image storage and recovery.

FIG. 10 shows the application of the invention to the recording and recovery of image templates, wherein like elements of the same function have been given the same number as in FIG. 6, and with added elements of duplicate but readout function given the same numbers with the addition of a prime. Also, this discussion will serve to generalize and review the operation of the invention.

Thus, the recording portion of the procedure is accomplished by providing a plurality of templates containing data or images to be recorded, and also providing a recording medium distributed over a surface and having a sufficient thickness to provide a volume for recording volume holograms. A first coherent light beam is provided to modulate successive one of said templates to produce an image beam which is imaged by suitable optics in a first direction, and Fourier transformed by other optics in a second direction orthogonal with reference to the first direction. Then, these are combined with a reference beam coherent with said first coherent light beam and imaged with the modulated beam onto a region in said medium to form a volume hologram, as has been described.

The angle of impingment of the reference beam into the media is then changed with the substitution of successive templates so as to angularly multiplex the templates into holograms in the medium at the said region. Thereafter, the medium is moved to bring a new region up for exposure, whereby successive groups of beams modulated with successive groups of templates are imaged in successive regions in said medium.

A method for recovering the templates stored by this process includes illuminating the holograms in successive regions with reference beam 157 to generate a diffracted beam 159 containing the template information, imaging said diffracted beam in a first direction with a lenses 94'90', and Fourier transforming said diffracted beam with a cylindrical lens 92' in a second direction orthogonal to said first direction to reconstruct said template. Then, the reference beam angle is progressively changed and/or the location of the region changed or scanned to readout successive templates.

While the invention has been described with reference to angular multiplexing to record plural holograms in a single spot, frequency multiplexing may be used instead. In frequency multiplexing, rather than stepping the angular portion of the mirror 154 with each hologram to be recorded in the same spot, the output frequency of the laser 110 is stepped instead. During playback, the laser's frequency is again stepped to read out each hologram in a given spot.

While the invention has been described in detail by specific reference to preferred embodiments thereof, it is understood that variations and modifications thereof may be made without departing from the true spirit and scope of the invention.

What is claimed is:

1. An optical correlator comprising:
   an optical recording medium said medium comprising an optical recording layer of a sufficient thickness for recording volume holographic information B
   optical modulator means receiving an image signal representing one of (a) one of a set of template images or (b) an input image, and for modulating a coherent light beam to produce an image beam corresponding to said image signal;
   means for imaging said image beam on a selected spot on said optical recording medium in a first direction while Fourier transforming said image beam in a second direction orthogonal to said first direction on said selected spot on said optical recording medium
   recording reference beam source means, operable whenever said image signal represents successive respective ones of said set of template images, for projecting a reference beam onto said selected spot at successive respective angles relative to said optical recording medium, said reference beam being coherent with said coherent image beam, to form respective angularly multiplexed volume holograms in said optical recording layer at said spot;
   correlation means comprising plural line detectors aligned in said second direction at a correlation plane, operable whenever said image signal represents said input image, for sensing at respective line detectors Fourier transformed versions of respective patterns of said image beam diffracted by respective volume holograms in said selected spot, each of said patterns corresponding to a one-dimensional slice of a two-dimensional correlation of said input image with a corresponding one of said template images; and
   means for moving said optical recording medium in said first direction so as to scan said image beam across said spot, whereby to generate a two-dimensional correlation function for each one of said patterns.

2. The optical correlator of claim 1 wherein said recording medium comprises a rotatable optical disk, and wherein said first direction generally corresponds to a tangent along a circumference of said disk at a radius of said disk intersecting said spot, and said second direction corresponds to said radius of said disk intersecting said spot, and wherein said means for moving said optical recording medium comprises means for rotating said disk.

3. The optical correlator of claim 1 wherein said imaging and transforming means comprise a first pair of cylindrical lenses having their cylindrical axes oriented so as to cause said image beam to be imaged along said first direction at said spot on said optical recording medium and a middle cylindrical lens between said pair of cylindrical lenses having its cylindrical axis oriented so as to Fourier transform along said second direction said image beam at said spot.

4. The optical correlator of claim 1 wherein said correlation means further comprises a spherical lens between said disk and said correlation plane for generating said Fourier transformed version of said pattern of said image beam diffracted by said respective hologram.

5. The optical correlator of claim 1 further comprising phase diffuser means for uniformly distributing energy of said image beam across said spot.

6. The optical correlator of claim 1 wherein said recording reference beam source means comprises a rotatable mirror in a path of said reference beam and means for successively positioning said rotatable mirror at rotational positions corresponding to successive ones of said respective angles.

7. The optical correlator of claim 6 further comprising optical means in the path of said reference beam for maintaining said reference beam on said spot during rotation of said rotatable mirror.

8. An optical recording medium useful for performing optical correlations, comprising:
   an optical recording layer of a thickness sufficient for recording volume holographic information throughout the volume of each of a plurality of spots therein;
   a plurality of recorded spots in said medium spaced apart along a first direction, each of said spots including plural multiplexed volume holograms of template images imaged along said first direction and Fourier transformed along a second direction orthogonal to said first direction.

9. The optical recording medium of claim 8, wherein said optical recording layer comprises a rotatable disk, whereby said first direction corresponds to a rotation of said disk.

10. The optical recording medium of claim 8 wherein said multiplexed volume holograms are one of: (a) angularly multiplexed or (b) frequency multiplexed.

11. Apparatus for optically storing information comprising:
    an optical recording medium said medium comprising an optical recording layer of a sufficient thickness for recording volume holographic information throughout the volume of each of a plurality of spots therein;
    optical modulator means for modulating a coherent light beam in response to an image signal representing a successive one of a set of template images, so as to produce an image beam corresponding to said image signal;
    imaging and transforming means for imaging, in a first direction, said image beam on a selected spot on said optical recording medium while Fourier transforming, in a second direction orthogonal to said first direction, said image beam on said selected spot;
    recording reference beam source means for projecting a reference beam onto said selected spot, said reference beam being coherent with said coherent light beam, whereby to generate a hologram of a respective template image through the volume in said spot;
    means for multiplexing holograms of all of said set of template images in said spot;
    means for moving said medium whereby said image beam is imaged onto a successive spots on said medium, whereby successive sets of multiplexed holograms are recorded in said successive spots.

12. The apparatus of claim 11 wherein said means for angularly multiplexing employs frequency multiplexing, and comprises:
means for changing the frequency of said light beam to successive respective frequencies corresponding to successive ones of said set of template images, whereby to form respective frequency multiplexed volume holograms in said optical recording layer.

13. The apparatus of claim 11 wherein said movable recording medium comprises a rotatable optical disk, and wherein said first direction generally corresponds to a tangent along a circumference of said disk at a radius of said disk intersecting said spot, and said second direction corresponds to said radius of said disk intersecting said spot, and wherein said means for moving said optical recording medium comprises means for rotating said disk.

14. The apparatus of claim 11 wherein said imaging and transforming means comprise a first pair of cylindrical lenses having their cylindrical axes oriented so as to cause said image beam to be imaged along said first direction at said spot on said optical recording medium and a middle cylindrical lens between said pair of cylindrical lenses having its cylindrical axis oriented so as to Fourier transform along said second direction said image beam at said spot.

15. The apparatus of claim 11 wherein said means for multiplexing employs angular multiplexing and comprises:
means for changing the angle of said reference beam to successive respective angles relative to said optical recording medium corresponding to successive ones of said set of template images, whereby to form respective angularly multiplexed volume holograms in said optical recording layer at said spot.

16. The apparatus of claim 15 wherein said recording reference beam source means comprises a rotatable mirror in a path of said reference beam and means for successively positioning s aid rotatable mirror a t rotational positions corresponding to successive ones of said respective angles.

17. The apparatus of claim 16 further comprising optical means in the path of said reference beam for maintaining said reference beam on said spot during rotation of said rotatable mirror.

18. A method of performing correlation in an optical recording medium said medium comprising an optical recording layer of a sufficient thickness for recording volume holographic information throughout the volume of each of a plurality of spots therein, said method comprising:
modulating a coherent light beam in response to an image signal representing one of (a) one of a set of template images or (b) an input image, so as to produce an image beam corresponding to said image signal;
imaging, in a first direction, said image beam on a selected spot on said optical recording medium while Fourier transforming, in a second direction orthogonal to said first direction, said image beam on said selected spot;
causing said image signal successively to represent respective ones of said set of template images, while successively projecting a reference beam onto said selected spot at respective angles relative to said optical recording medium, said reference beam being coherent with said coherent light beam, whereby to record respective angularly multiplexed volume holograms throughout the volume of said optical recording layer at said spot;
after recording of said holograms in said optical recording layer, causing said image beam to represent said input image while detecting at plural line detectors aligned in said second direction at a correlation plane Fourier transformed versions of respective patterns of said image beam diffracted by respective volume holograms in said selected spot, each of said patterns corresponding to a one-dimensional slice of a two-dimensional correlation of said input image with a corresponding one of said template images; and, simultaneously,
moving said optical recording medium in said first direction so as to scan said image beam across said spot, whereby to generate a two-dimensional correlation function for each one of said patterns.

19. The method of claim 18 wherein said movable recording medium comprises a rotatable optical disk, and wherein said first direction generally corresponds to a tangent along a circumference of said disk at a radius of said disk intersecting said spot, and said second direction corresponds to said radius of said disk intersecting said spot, and wherein said moving said optical recording medium comprises rotating said disk.

20. The method of claim 18 further comprising generating with a spherical lens said Fourier transformed version of said pattern of said image beam diffracted by said respective hologram.

21. The method claim 18 further comprising maintaining said reference beam on said spot during the changing of the angle of said reference beam.

22. The method of claim 18 further comprising uniformly distributing energy of said image beam across said spot by a phase diffuser.

23. A method of producing an optical recording medium including an optical recording layer of a thickness sufficient for recording volume holographic information throughout the volume of each of a plurality of spots therein, comprising:

24. The method of claim 23 wherein said optical recording layer comprises a rotatable disk, whereby said first direction corresponds to a rotation of said disk.

25. The method of claim 23 wherein said recording comprises one of: (a) angularly multiplexing the holograms recorded in each spot and (b) frequency multiplexing the holograms recorded in each spot.

26. A method of optically storing information in an optical recording medium said medium comprising an optical recording layer of a sufficient thickness for recording volume holographic information throughout the volume of each of a plurality of spots therein, comprising:
modulating a coherent light beam in response to an image signal representing a successive one of a set of template images, so as to produce an image beam corresponding to said image signal;
imaging, in a first direction, said image beam on a selected spot on said optical recording medium while Fourier transforming, in a second direction orthogonal to said first direction, said image beam on said selected spot;
projecting a reference beam onto said selected spot, said reference beam being coherent with said coherent light beam, whereby to generate a hologram of a respective template image in said spot;

multiplexing holograms of all of said set of template images in said spot; moving said medium whereby said image beam is imaged onto a successive spots on said medium, whereby successive sets of multiplexed holograms are recorded in said successive spots.

27. The method of claim 26 wherein said multiplexing employs angular multiplexing and comprises:
changing the angle of said reference beam to successive respective angles relative to said optical recording medium corresponding to successive ones of said set of template images, whereby to form respective angularly multiplexed volume holograms in said optical recording layer at said spot.

28. The method of claim 26 wherein said multiplexing employs frequency multiplexing, and comprises:
changing the frequency of said light beam to successive respective frequencies corresponding to successive ones of said set of template images, whereby to form respective frequency multiplexed volume holograms in said optical recording layer.

29. The method of claim 26 wherein said movable recording medium comprises a rotatable optical disk, and wherein said first direction generally corresponds to a tangent along a circumference of said disk at a radius of said disk intersecting said spot, and said second direction corresponds to said radius of said disk intersecting said spot, and wherein said moving said optical recording medium comprises rotating said disk.

30. A method for optically recording and recovering information contained in a plurality of templates, comprising:
providing a recording medium distributed over a surface and having a sufficient thickness to provide a volume of said surface for recording volume holograms throughout the volume of each of a plurality of regions therein,
providing a first coherent light beam,
modulating a second coherent light beam which is coherent with said first beam with successive one of said templates to produce a succession of image beams,
imaging said modulated beam in a first direction,
Fourier transforming said modulated beam in a second direction orthogonal from said first direction,
forming a reference beam coherent with said first coherent light beam,
simultaneously imaging said modulated beam and said reference beam onto said region in said medium to form a volume hologram therein,
progressively changing the angle of impingement of said reference beam into the media so as to angularly multiplex the templates into said medium at said location, and
moving said medium so that said beams are imaged in successive regions in said medium while changing said templates.

31. A method of recovering the templates stored by the process of claim 30 further comprising:
illuminating the region with a reference beam to generated a diffracted beam containing the template information,
imaging said diffracted beam in a first direction,
Fourier transforming said diffracted beam in a second direction orthogonal to said first direction to reconstruct said template,
change the reference beam angle or location of the region to readout successive templates.

32. Apparatus for optical recording and recovering information contained in a plurality of templates, comprising means for providing a recording medium distributed over a surface and having a sufficient thickness and provide a volume of said surface for recording optical holograms throughout the volume of each of a plurality of regions therein,
means for providing a first coherent light beam;
means for modulating said coherent light beam with an image of one Of said templates to produce an image beam,
means for imaging said modulated beam in a first direction
means for Fourier transforming said modulated beam in a second direction different from said first direction,
means for forming a reference beam coherent with said first coherent light beam,
means for imaging said modulated beam and said reference beam onto a region in said medium to form a volume hologram therein, and
means for moving said medium so that said beams are imaged in successive regions in said medium while changing said templates.

33. Apparatus for recovering the templates stored by the apparatus of claim 32 comprising:
means for illuminating the region with a reference beam to generated a diffracted beam containing the template information,
means for imaging said diffracted beam in a first direction,
means for Fourier transforming said diffracted beam in a second direction orthogonal to said first direction to reconstruct said template,
means for changing the reference beam angle or location of the region to readout successive templates.

34. A method for optically recording and recovering information contained in a plurality of templates, comprising:
providing a recording medium distributed over a surface and having a thickness to provide a volume for recording volume holograms throughout the volume of each of a plurality of regions therein,
providing a first coherent reference light beam and a second coherent light beam coherent with said first beam,
modulating said second coherent light beam with successive ones of said templates to produce a succession of image beams,
imaging said modulated beam in a first direction,
Fourier transforming said modulated beam in a second direction orthogonal from said first direction,
simultaneously illuminating said modulated beam and said reference beam into said region in said medium to form a volume hologram therein,
progressively changing the angle of said reference beam so as to angle multiplex the templates into said medium at said location,
moving said medium so that said beams are illuminated in successive regions in said medium, and subsequently
presenting a second coherent light beam with information from an unknown template,
moving the medium relative to that beam to generate correlation functions for said unknown template,
recovering a correlated template by
illuminating the region with an unmodulated, coherent readout beam to generate a diffracted beam containing the correlated template information,
imaging said diffracted beam in a first direction,
Fourier transforming said diffracted beam in a second direction orthogonal to said first direction to reconstruct said correlated template.

* * * * *